(12) United States Patent
Stoker

(10) Patent No.: US 9,373,023 B2
(45) Date of Patent: Jun. 21, 2016

(54) METHOD AND APPARATUS FOR ROBUSTLY COLLECTING FACIAL, OCULAR, AND IRIS IMAGES USING A SINGLE SENSOR

(75) Inventor: David Stoker, Burlingame, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 1107 days.

(21) Appl. No.: 13/402,038

(22) Filed: Feb. 22, 2012

(65) Prior Publication Data

US 2013/0215228 A1    Aug. 22, 2013

(51) Int. Cl.
*G06K 9/00*      (2006.01)
*H04N 13/02*     (2006.01)

(52) U.S. Cl.
CPC ........ *G06K 9/00255* (2013.01); *H04N 13/0239* (2013.01)

(58) Field of Classification Search
CPC ..................... G06K 9/00255; H04N 13/0239
See application file for complete search history.

(56) References Cited

U.S. PATENT DOCUMENTS

| | | | | |
|---|---|---|---|---|
| 3,785,262 A | * | 1/1974 | Stroke | 396/333 |
| 5,063,603 A | * | 11/1991 | Burt | 382/115 |
| 5,282,045 A | * | 1/1994 | Mimura et al. | 348/352 |
| 5,283,672 A | * | 2/1994 | Hong et al. | 359/7 |
| 5,572,596 A | * | 11/1996 | Wildes et al. | 382/117 |
| 5,739,857 A | * | 4/1998 | Kaneda | 348/349 |
| 5,912,650 A | * | 6/1999 | Carollo | 345/7 |
| 8,878,950 B2 | * | 11/2014 | Lelescu et al. | 348/218.1 |
| 2001/0055429 A1 | * | 12/2001 | Hirosawa et al. | 382/284 |
| 2002/0090145 A1 | * | 7/2002 | Yamada | 382/284 |
| 2003/0019931 A1 | * | 1/2003 | Tsikos et al. | 235/454 |
| 2003/0184561 A1 | * | 10/2003 | Vorst | 345/619 |
| 2003/0185424 A1 | * | 10/2003 | Sato et al. | 382/118 |
| 2004/0170304 A1 | * | 9/2004 | Haven et al. | 382/115 |
| 2005/0068454 A1 | * | 3/2005 | Afsenius | 348/345 |
| 2006/0132523 A1 | * | 6/2006 | Xie et al. | 347/16 |
| 2006/0245046 A1 | * | 11/2006 | Bergeron et al. | 359/366 |
| 2007/0008326 A1 | * | 1/2007 | Levien et al. | 345/501 |
| 2007/0024713 A1 | * | 2/2007 | Baer et al. | 348/207.99 |
| 2007/0229498 A1 | | 10/2007 | Matusik et al. | |
| 2008/0122943 A1 | * | 5/2008 | Itoh | 348/222.1 |
| 2008/0211766 A1 | | 9/2008 | Westerman et al. | |
| 2008/0292144 A1 | * | 11/2008 | Kim | 382/117 |
| 2010/0033677 A1 | | 2/2010 | Jelinek | |
| 2011/0017280 A1 | * | 1/2011 | Rumsby | 136/251 |
| 2011/0212717 A1 | | 9/2011 | Rhoads et al. | |

(Continued)

OTHER PUBLICATIONS

Canon; Canon EF Lens Specifications & Accessories Table, 2005, Canon, Canon, p. 1.*

(Continued)

*Primary Examiner* — Sath V Perungavoor
*Assistant Examiner* — Peter D Le
(74) *Attorney, Agent, or Firm* — Barnes & Thornburg, LLP

(57) ABSTRACT

The present invention relates to a method and apparatus for standoff facial and ocular acquisition. Embodiments of the invention address the problems of atmospheric turbulence, defocus, and field of view in a way that minimizes the need for additional hardware. One embodiment of a system for acquiring an image of a facial feature of a subject includes a single wide field of view sensor configured to acquire a plurality of images over a large depth of field containing the subject and a post processor coupled to the single sensor and configured to synthesize the image of the facial feature from the plurality of images.

20 Claims, 3 Drawing Sheets

(56) References Cited

U.S. PATENT DOCUMENTS

2012/0070096 A1* 3/2012 Oyama .................. G06T 5/003
                                                          382/254
2012/0201477 A1* 8/2012 Jesneck et al. ................ 382/279
2014/0192166 A1* 7/2014 Cogswell et al. ............... 348/49

OTHER PUBLICATIONS

PCT Search Report and Written Opinion for International Patent Application Serial No. PCT/US13/27131, mailed May 21, 2013, consists of 9 unnumbered pages.

* cited by examiner

METHOD AND APPARATUS FOR ROBUSTLY COLLECTING FACIAL, OCULAR, AND IRIS IMAGES USING A SINGLE SENSOR

REFERENCE TO GOVERNMENT FUNDING

This invention was made with Government funding under Contract No. W911NF-10-C-0023, awarded by the Intelligence Advanced Research Projects Activity. The Government has certain rights in this invention.

FIELD OF THE INVENTION

The present invention relates generally to biometric recognition applications, and relates more particularly to acquisition of facial and ocular features from standoff distances of greater than approximately one meter.

BACKGROUND OF THE DISCLOSURE

The acquisition of physiological biometric features such as facial and ocular features is a necessary step in most biometric recognition applications (e.g., facial recognition, iris recognition, and the like). Several factors, however, make it difficult for conventional systems to acquire images of the quality necessary to ensure good recognition results, particularly if the biometric features of interest are small (as is the case with the human iris) and/or if the images are collected in an uncontrolled environment. For instance, if the range of the subject is uncertain, or if atmospheric turbulence is present, the image captured may be unusable due to poor focus or blur. In order to prevent defocus and blur, range-finding or turbulence compensation hardware is typically used.

Another problem with standoff acquisition is that the high resolution required in biometric applications leads to a "soda straw" problem in which peripheral information about the scene is lost. Therefore, it is necessary to simultaneously use low-resolution, wide field of view sensors in order to time the acquisition of a single high-resolution image containing usable biometric information. Thus, as the conditions become more challenging, the cost of standoff biometric acquisition increases due to the many additional pieces of hardware that are required.

SUMMARY OF THE INVENTION

The present invention relates to a method and apparatus for standoff facial and ocular acquisition. Embodiments of the invention address the problems of atmospheric turbulence, defocus, and field of view in a way that minimizes the need for additional hardware. One embodiment of a system for acquiring an image of a facial feature of a subject includes a single wide field of view sensor configured to acquire a plurality of images over a large depth of field containing the subject and a post processor coupled to the single sensor and configured to synthesize the image of the facial feature from the plurality of images.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
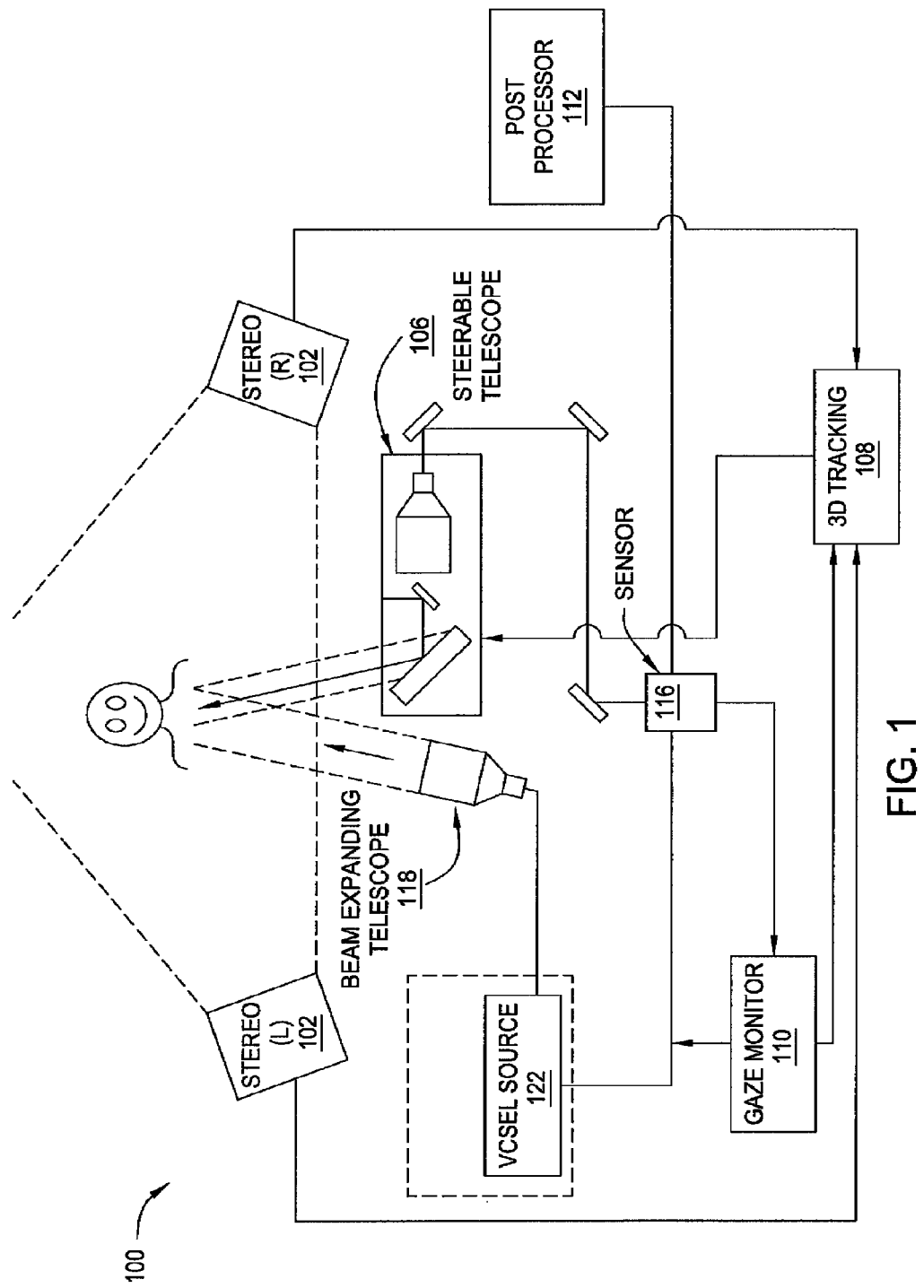
FIG. 1 is a high-level schematic diagram illustrating one embodiment of a facial and ocular acquisition system, according to the present invention.

The present invention relates to a method and apparatus for automatically acquiring images of faces, ocular regions, and irises from moving subjects at standoff distances of up to approximately fifty meters (and at a frame rate of at least several hundred Hertz). Embodiments of the invention collect a burst of low resolution images that span a large depth of field containing the subject. The burst of images is then analyzed via post-processing to synthesize a large depth of field, super-resolved image of the subject. This enables the present invention to acquire a high-resolution image (e.g., greater than 2 line pairs per millimeter) of both the human iris and the human face from the same sensor using the same optics. The images can be collected from distances greater than several meters, even when the subject is in motion (e.g., at a continuous speed of greater than 1.5 meters per second), and without the need for expensive tracking technologies.

Moreover, embodiments of the present invention are tolerant to turbulence (e.g., blurring due to natural atmospheric motion between the sensor and the subject), since multiple frames of a blurred image may be synthesized to produce a single, in-focus image. In addition, it is noted that the present invention may be used to acquire facial and ocular images of non-human as well as human subjects.

Embodiments of the present invention can be used to effectively extend the depth of field of the imaging system, since the sensor collects images over a large spanning distance in the target space. Each of the individual target images can be fused together to produce a single image with an apparent focal depth that can be several hundred times larger than that of the individual image depth of field. As a result, expensive range finders are not necessary, and only coarse range information from passive sensors (e.g., stereo cameras) can be used to provide sufficient target localization information.

Embodiments of the invention can also extend the field of view of the sensor. Because the image is collected using a lower F-number objective, the apparent field of the sensor is much larger. For example, individual image frames cannot resolve iris features smaller than two line pairs per millimeter with high contrast. However, when several images are fused together, it is possible to achieve the resolution of a single image collected using a high F-number objective. This wider field of view is also used to monitor the gaze and expression of the subject. When the gaze and facial orientation is within a tolerance, images are saved to memory.

Embodiments of the invention can also improve signal to noise. Large F-number objectives have a lower acceptance angle, and less light is therefore transmitted to the sensor in a given integration time. At long range, loss of signal can lead to recognition failures. Because a lower F-number system is employed, integration for shorter interval durations is possible. This mitigates target blur and achieves a signal-to-noise ratio (SNR) that is comparable to that of a higher F-number system. In addition, a higher SNR is achieved after averaging multiple frames, because data that is uncorrelated from frame to frame (e.g., shot noise) is reduced.

FIG. 1 is a high-level schematic diagram illustrating one embodiment of a facial and ocular acquisition system 100, according to the present invention. The system 100 acquires a comprehensive subject identification dataset, including iris, ocular region, facial features, and facial texture data.

As illustrated, the system 100 generally comprises a wide field of view subject tracker 102, a steerable telescope 106, a three-dimensional (3D) trajectory generator 108, a gaze monitor 110, a post processor 112, a steerable beam expanding telescope 118, and a light source 122.

The subject tracker 102 comprises a camera that performs imaging and tracking of subjects. Specifically, the subject tracker 102 tracks multiple individuals within a given area, based on a set of detection criteria. In one embodiment, the detection criteria are based on physical shape and size. Thus, the subject tracker 102 may identify subjects for tracking based on analysis of their head and torso regions. Additionally, the subject tracker 102 computes image motion and range motion for a subject's head and facial regions (including nodding and/or bobbing motions). In one embodiment, the subject tracker 102 is a three-dimensional, stereo-based camera.

The 3D trajectory generator 108 locates and tracks a subject's ocular region within the center of the steerable telescope's high-resolution field of view at a frame rate in excess of one hundred frames per second Specifically, logic controls in the 3D trajectory generator help determine where to aim the steerable telescope 106. The 3D trajectory generator 108 additionally generates a first feature trajectory that is later used to mitigate the effects of motion blur. Together, the subject tracker 102, the steerable telescope 106, and the 3D trajectory generator 108 form a dynamic sub-system that moves with a subject. The 3D trajectory generator 108 contains a computer operating system running software that uses 3D subject position data from the subject tracker 102 to produce a continuous, 3D trajectory of the subject's head, ocular region, and pupil. In one embodiment, the 3D trajectory generator 108 records a history of time varying locations of Haar features for the head, ocular region and pupil identified by the subject tracker 102 and gaze analysis system 110. The Haar feature location histories are processed by a Kalman filter to generate trajectories that predict where the features will be located up to 500 milliseconds into the future. Those trajectories are then uploaded to a closed loop control system on the steerable telescope 106 to refine the Gimbal and secondary mirror positions such that a subject's face is both in the steerable telescope's field of view and in focus.

The steerable telescope 106 is an automated steering and focusing telescope that has three degrees of freedom to control the altitudinal and azimuthal steering angles, and the position of the sensor in order to maintain focus on the subject. The three degrees of freedom are constrained by feature trajectories that are produced by the 3D trajectory generator 108 from subject position data returned by the subject tracker 102. The steerable telescope 106, which steers to the subject's head, steers the field of view of the sensor 116. In one embodiment, the steerable telescope 106 is a F/5 Ritchey-Chretien telescope with a movable secondary mirror connected to an AC servo motor, an elliptical mirror that is mounted on a two-axis Gimbal that is connected to two encoded AC servo motors, and a closed loop motion controller for controlling the Gimbal servo motors and secondary mirror motor.

The sensor 116 is positioned behind the objectives in the steerable telescope 106 in order to record digital images of the subject. The sensor 116 operates as both a facial imaging sensor and an ocular imaging sensor. That is, the single sensor 116 is used to perform both facial and ocular recognition. In one embodiment, the sensor 116 is a wide field/low resolution feature tracking sensor with a field of view of at least ten inches by ten inches, covered by no less than one thousand pixels by one thousand pixels. In one embodiment, the sensor 116 operates at a frame rate of greater than several hundred Hertz (e.g., 500 HZ) and uploads all images to the gaze monitor 110 and post processor 112 in real time. In one embodiment, the sensor 116 is a BASLER A504k CCD array.

In one embodiment, the light source 122 is a speckle-free class-I infrared light source with a wavelength between 700 nm and 1550 nm. The light source 122 includes interlocks that prevent accidental exposure of a target to light levels that exceed those published by the American National Standards Institute (ANSI). Light emission from the light source 122 is synchronized with the short duration sensor exposures from the low-resolution sensor 116. Emission from light source 122 is diffused and expanded to fill a steerable beam expanding telescope 118 that then collimates and directs the beam of light emission in a direction that is determined by the closed loop motion control system contained in the steerable telescope 106. Thus, the light source 122 is collimated and diffused to illuminate a subject's head located at a distance of greater than ten meters from the steerable telescope 106. In one embodiment, the light source 122 is a high power array of pulsable Vertical Cavity Surface Emitting Lasers (VCSELs) with tunable pulse energy at 800 nm. Pulse durations of the light source 122 are between 100 microseconds and 100 milliseconds long. The VCSEL array is focused onto an engineered diffusing optic and collimated with the steerable beam expanding telescope 118 embodied by a F1 Fresnel lens with 100 grooves per inch and a diameter of 12.5 inches. In one embodiment, the VCSEL array is demonstrated to conform to American National Standards Institute (ANSI) limitations for maximum permissible exposure in the wavelength region of 700 to 1500 nanometers (and thus may be considered, within the context of the present invention, to be "eye safe") and is synchronized to the capture of low-resolution images.

The gaze monitor 110 continuously identifies and tracks the motion of a subject's pupils in order to determine whether a subject is looking at the steerable telescope 106. In one embodiment, the gaze angle is determined by measuring the location of the specular glint relative to the subject's pupil circumference. Glint is created using a high-repetition strobe, no less than one hundred Hz and synchronized with the low-resolution sensor 116. In one embodiment, the high-repetition strobe is created by the light source 122 and directed to the subject by the steerable beam expanding telescope 118. The subject's pupils are identified through the brightness of the retinal reflection and the existence of symmetric pairs with respect to the symmetry axis of the subject's face. When the gaze is within a range of predefined tolerance values, low-resolution images are saved to memory in the post-processor 112.

The post processor 112 synthesizes a single, high-resolution image from the plurality of low-resolution images that are acquired by the sensor 116. In addition, the post processor may perform additional operations on the plurality of images, for example to extend the depth of field in the single, high-resolution image (relative to the plurality of low-resolution images) or to minimize the effects of turbulence.

In one embodiment, the post processor 112 compensates for defocus by fusing together a sequence of low-resolution images. The post processor 112 may use any one or more of a plurality of techniques to develop an in-focus image of the subject, including image region segmentation and fusion of different image segments in the image stack.

In one embodiment, the post processor 112 minimizes turbulence by fusing together a sequence of images collected by the low-resolution sensor 116. The post processor 112 may use any one or more of a plurality of techniques to minimize the turbulence. In one embodiment, the post processor 112 registers images, fuses the images together using a weighted averaging, and sharpens the final fused image using a blind deconvolution algorithm. Image de-warping may also be carried out by first segmenting the image, then fusing the segments, and finally stitching the segments together.

Figure 2:
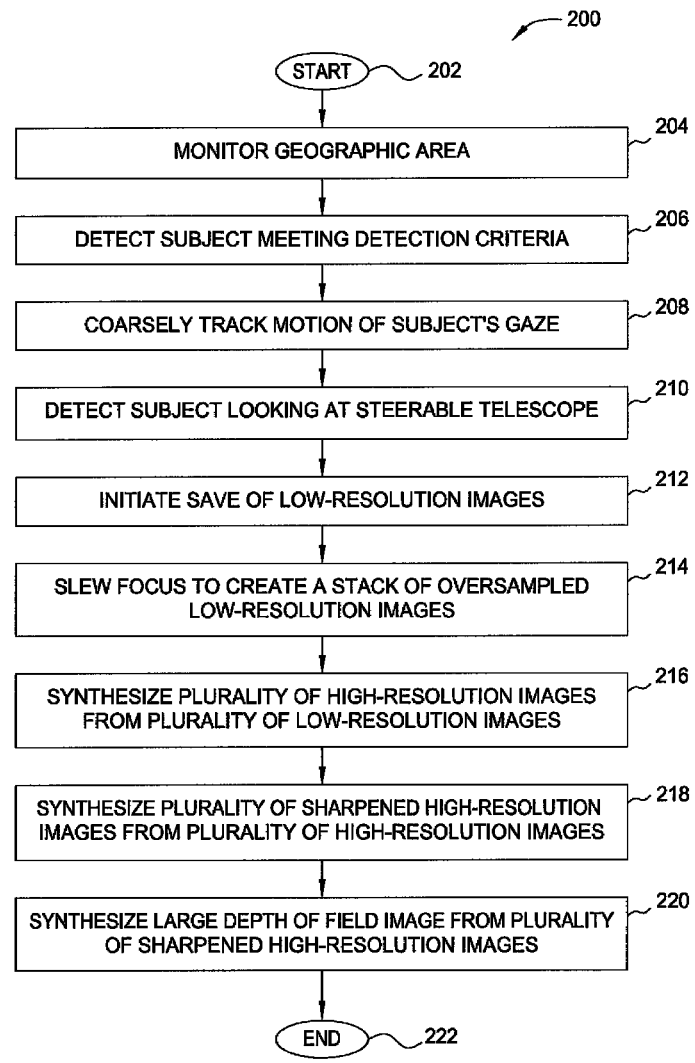
FIG. 2 is a flow diagram illustrating one embodiment of a method for facial and ocular acquisition, according to the present invention.

FIG. 2 is a flow diagram illustrating one embodiment of a method 200 for facial and ocular acquisition, according to the present invention. The method 200 may be implemented, for example, by the facial and ocular acquisition system 100 illustrated in FIG. 1. As such, reference is made in the discussion of the method 200 to various elements of the facial and ocular acquisition system 100. It will be appreciated, however, that the method 200 is not limited to implementation with a facial and ocular acquisition system configured exactly as illustrated in FIG. 1. That is, the method 200 may be implemented in a facial and ocular acquisition system having configurations that differ from that illustrated in FIG. 1.

The method 200 is initialized in step 202 and proceeds to step 204, where the system 100 monitors a given geographic area. In particular, a predefined field of view is chosen, thereby defining the depth of field to be monitored. The focus of the sensor 116 is then swept at a high frame rate over the predefined field of view. This continually changes the plane of focus as a function of time, while containing the plane of focus between two boundary values. In one embodiment, the sensor 116 captures at least sixteen samples at each focus position.

In step 206, the subject tracker 102 detects a subject that meets a given set of detection criteria (based, for example, on physical shape and size, as discussed above). In one embodiment, step 206 is performed by the subject tracker 102. In one embodiment, the subject tracker 102 determines the approximate angular location and range of subjects containing biometric features.

In step 208, the gaze monitor 110 coarsely tracks the motion of the subject's gaze (e.g., pupils). In one embodiment, tracking of the subject's gaze utilizes a recognition technique that is based on the size and shape of the subject's head. In step 210, the gaze monitor 110 detects that the subject is looking at the steerable telescope 106. In one embodiment, the gaze of the subject is detected by monitoring for eye glint. This may be accomplished by observing the position of a specularly reflected near-infrared beam from the light source 122.

In step 212, the sensor 116 begins to save a burst of low-resolution images to memory in response to the subject looking at the steerable telescope 106. In one embodiment, the saving of the low-resolution images is triggered by a gaze detection technique operating in conjunction with a facial detection technique. In step 214, the steerable telescope begins sweeping the focus of the sensor 116. In one embodiment, the locations of the subject's head, ocular region, and iris region within the field of view of the steerable telescope's sensor 116 are refined using visual image servoing before the images are captured. Thus, the entire space surrounding the subject is sampled by the sensor 116. This step may be referred to herein as "oversampling."

In step 216, the post processor 112 synthesizes a plurality of high-resolution images from the plurality of low-resolution images obtained in step 214. In one embodiment, the post processor 112 selects a range of sequential low-resolution images in which the subject is within some threshold metric of focal quality (e.g., as defined by a frequency content of the images or simply by a bounding box that spans the range reported by the subject tracker 102). These images are then fused together to produce a super-resolved image of the subject. In the same embodiment, a second range of sequential low-resolution images is super-resolved. The two resulting high-resolution images can then be segmented and fused together to produce a single high-resolution image with an effectively larger depth of field. The depth of field is large because the focus of the sensor 116 is swept during image acquisition in step 214 and the final output image has an apparent focal depth that is much greater than the focal depth of the individual images.

In step 218, the post processor 112 sharpens the plurality of high-resolution images (e.g., using blind deconvolution) to produce a plurality of sharpened, blur-free high-resolution images. Then, in step 220, the post processor 112 segments and fuses together the plurality of sharpened, blur-free high-resolution images. This produces a single large depth of field, blur free, high-resolution image.

The fusion of images may be facilitated using one or more algorithms, including image registration (i.e., transforming different sets of images into one coordinate system), super-resolution (i.e., resolution enhancement), turbulence (i.e., motion blur) mitigation, and denoising algorithms. In one embodiment, the depth of field of the super-resolved image is refocused using image segmentation and fusion, as discussed above. In one embodiment, turbulence is minimized using image registration and blind image deconvolution. In one embodiment, image and video denoising is performed using a sparse three-dimensional transform-domain collaborative filtering technique, such as a block-matching and three-dimensional filtering (BM3D) algorithm or a geometric locally adaptive sharpening (GLAS) algorithm.

The super-resolved image may subsequently be output, for example for use in biometric recognition applications (e.g., based on the facial and/or ocular features of the subject). The method 200 then terminates in step 222.

Thus, a single, low-resolution sensor is used to perform combined facial and ocular recognition. The sensor is low-resolution in the sense that the images that it captures are of a lower resolution than the final, super-resolved image that is produced. Useful biometric data can be obtained by oversampling in the depth of field, without the need to finely track the subject. In particular, by oversampling, multiple images within each depth of field can be registered and super-resolved. The wider field of view afforded by the multiple images allows more light to be collected per image pixel. Where the light source 122 is a VCSEL, the low-resolution images acquired by the sensor 116 may be resolved with enhanced accuracy, additionally facilitating image fusion. This approach may be particularly useful, for example, when subjects are not aware of the sensor 116 and do not interact with the sensor 116 in a predefined manner.

Moreover, the above approach facilitates mitigation of turbulence in the super-resolved image, as multiple images that have been blurred by motion of the intervening atmosphere can be synthesized to compute a single, in-focus image.

The range of the depth of field according to the disclosed embodiments is greater by a factor of hundreds of times. However, image quality is maintained so that the super-resolved image may be useful for applications that perform recognition based on the features of the human iris.

Additional advantages of the disclosed embodiments include reduced sensor readout noise (which is uncorrelated from image to image), the ability to decrease the magnification (e.g., F number) of the images so that more light is obtained (thereby improving the signal to noise ratio in the images), and reduced sensitivity to noise (which reduces the need for deconvolution).

Figure 3:
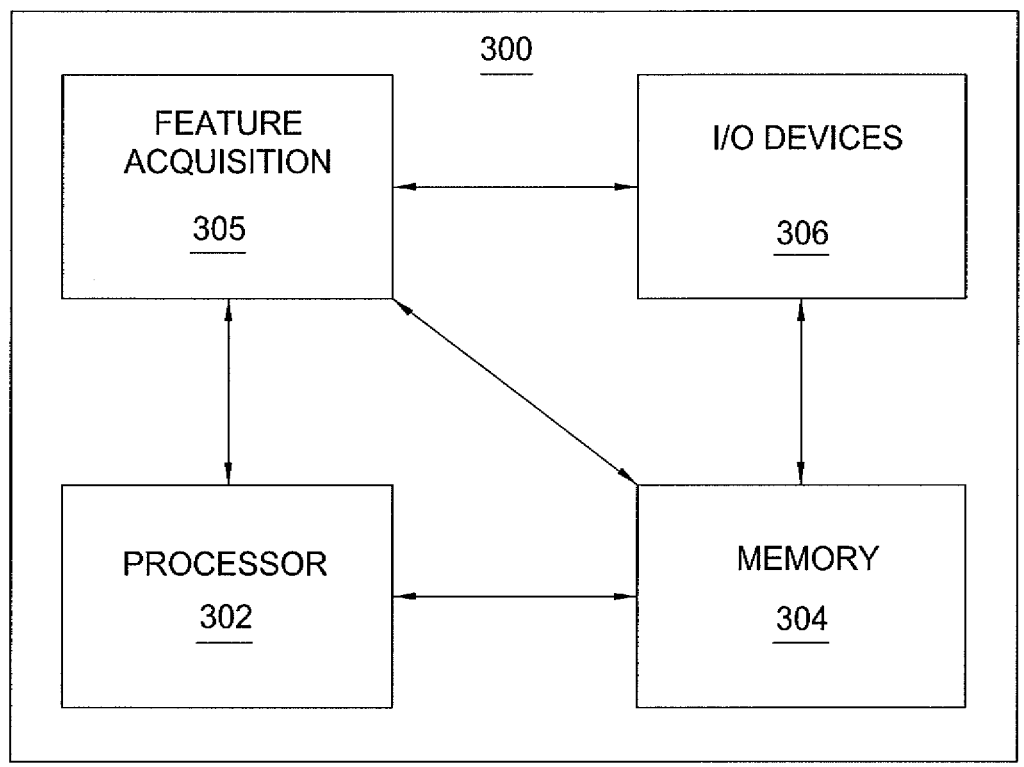
FIG. 3 is a high level block diagram of the present invention implemented using a general purpose computing device.

FIG. 3 is a high level block diagram of the present invention implemented using a general purpose computing device 300. It should be understood that embodiments of the invention can be implemented as a physical device or subsystem that is coupled to a processor through a communication channel. It is also important to note that the system can run autonomously or manually. Therefore, in one embodiment, a general purpose computing device 300 comprises a processor 302, a memory 304, a biometric feature acquisition module 305, and various input/output (I/O) devices 606 such as a display, a keyboard, a mouse, a modem, a microphone, speakers, a touch screen, a hybrid I/O device, and the like. In one embodiment, the touch screen is used by an operator to select the subject within a crowd of subjects who will be biometrically scanned. In one embodiment, at least one I/O device is a storage device (e.g., a disk drive, an optical disk drive, a floppy disk drive). In one embodiment, the facial and ocular acquisition proceeds automatically for all accessible subjects within the field of view.

Alternatively, embodiments of the present invention (e.g., I biometric feature acquisition module 305) can be represented by one or more software applications (or even a combination of software and hardware, e.g., using Application Specific Integrated Circuits (ASIC) or a Graphics Processing Unit (GPU)), where the software is loaded from a storage medium (e.g., I/O devices 306) and operated by the processor 302 in the memory 304 of the general purpose computing device 300. Thus, in one embodiment, the biometric feature acquisition 305 for performing long-range facial and ocular acquisition described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A system for acquiring an enhanced resolution image from a plurality of received telescopic low resolution images of a facial feature of a subject in a field of view, the system comprising:
 a memory comprising instructions that when executed by a hardware processor of the system implement a subject tracker, the subject tracker configured to track the subject;
 a single sensor coupled to the subject tracker and configured to acquire a burst of the plurality of received telescopic low resolution images of a depth of field in the field of view and containing the subject in response to determining, by the subject tracker, that the subject tracker has entered the field of view; and
 a post processor coupled to the single sensor, the post processor configured to track the facial feature through the plurality of received telescopic images and to create the enhanced resolution image of the facial feature from the plurality of received telescopic low resolution images by enhancing at least the depth of field and the field of view by selecting a range of sequential low-resolution images of the plurality of received telescopic low resolution images based on the subject being within a threshold of focal quality and fusing the selected range of images.

2. The system of claim 1, wherein the single sensor is low resolution and the enhanced resolution image is of high resolution.

3. The system of claim 1, wherein the single sensor is an only imaging sensor included in the system.

4. The system of claim 1, wherein a field of view of the single sensor is at least ten inches by ten inches.

5. The system of claim 4, wherein the field of view is covered by no less than one thousand pixels by one thousand pixels.

6. The system of claim 1, wherein the single sensor operates at a frame rate of greater than several hundred Hertz.

7. A method for acquiring an image of a facial feature of a subject in a telescopic field of view, the method comprising:
 acquiring a plurality of telescopic low resolution images of a depth of field containing the subject by at least tracking the facial feature through the plurality of images;
 selecting a range of sequential low-resolution images of the plurality of images based on the subject being within a threshold of focal quality; and
 synthesizing the image of the facial feature from the selected range of images by enhancing at least the depth of field and the field of view.

8. The method of claim 7, wherein a resolution of the plurality of images is less than a resolution of the image of the facial feature.

9. The method of claim 7, wherein the acquiring comprises sweeping a focus of a single sensor over the depth of field.

10. The method of claim 7, wherein the acquiring is performed at a frame rate of at least several hundred Hertz.

11. The method of claim 7, wherein the synthesizing comprises image region segmentation and fusion to extend the depth of field in a super-resolved version of the image of the facial feature relative to individual depths of field in the plurality of images.

12. The method of claim 7, wherein the synthesizing comprises mitigating turbulence in the plurality of images.

13. The method of claim 7, wherein the synthesizing comprises denoising the plurality of images.

14. The method of claim 7, wherein the acquiring comprises: saving the plurality of images as a burst of images having a low resolution relative to the image of the facial feature that is synthesized from the plurality of images.

15. The method of claim 14, wherein the saving is triggered by a gaze detection technique operating in conjunction with a facial detection technique.

16. The method of claim 7, wherein the acquiring is performed using a Vertical Cavity Surface Emitting Laser illumination source.

17. The method of claim 7, wherein the acquiring comprises: determining an approximate angular location and range of the subject containing biometric features.

18. The method of claim 17, wherein the determining is performed using a passive scene monitor based on a stereo camera.

19. A non-transitory computer readable storage medium containing an executable program for acquiring an image of a facial feature of a subject in a telescopic field of view, where the program performs steps comprising:
- acquiring a plurality of telescopic low resolution images of a depth of field containing the subject;
- selecting a range of sequential low-resolution images of the plurality of images based on the subject being within a threshold of focal quality; and
- synthesizing the tracked image of the facial feature from the selected range of images by enhancing at least the depth of field and the field of view.

20. The computer readable storage medium of claim 19, wherein a resolution of the plurality of images is less than a resolution of the image of the facial feature.

* * * * *